Jan. 6, 1953            H. V. KINDSETH            2,624,309

PASTING MECHANISM FOR BAG CLOSING AND SEALING MACHINES

Filed Nov. 13, 1950            6 Sheets-Sheet 2

Inventor
Harold V. Kindseth
By Merchant & Merchant
Attorneys

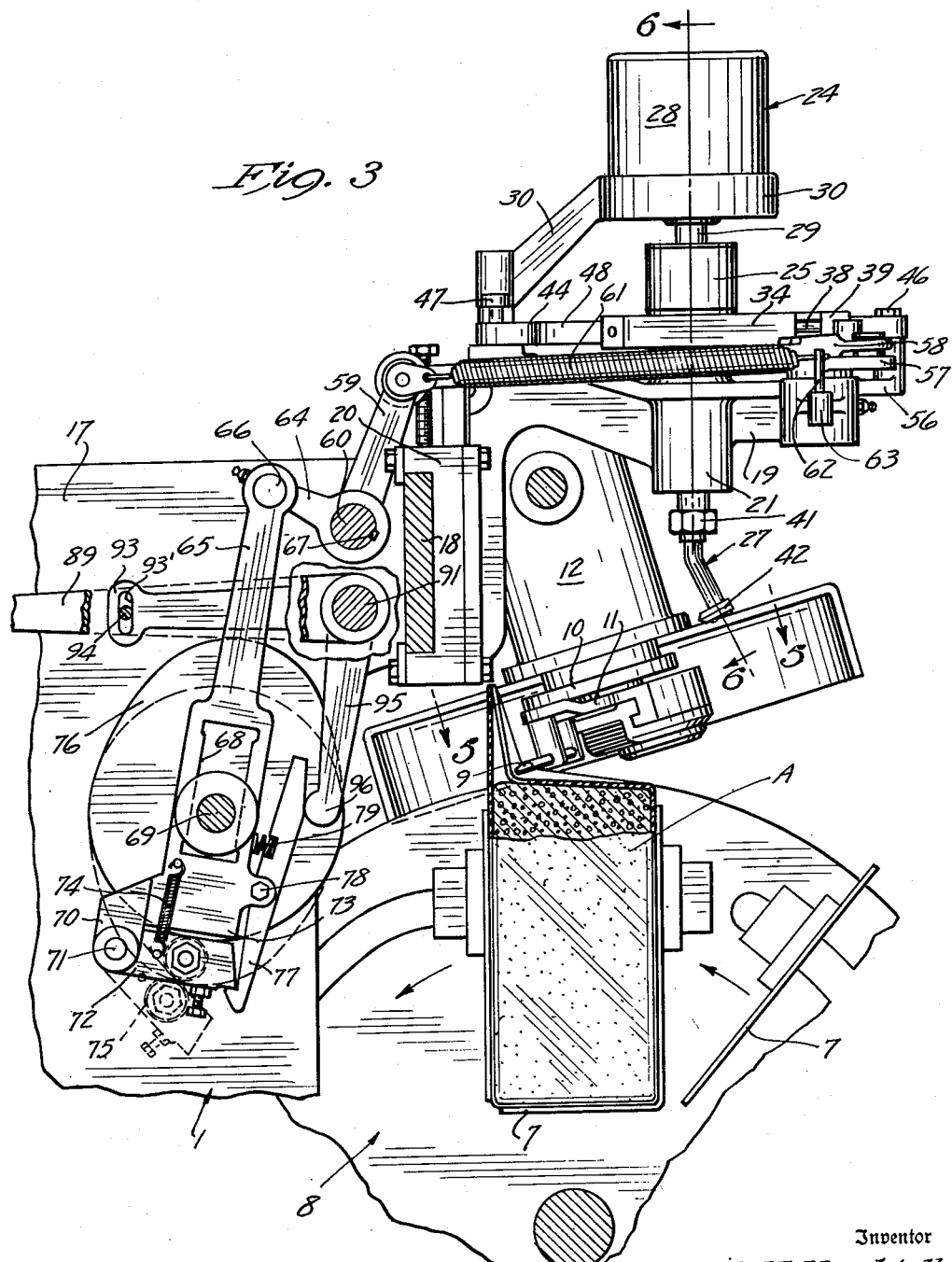

Jan. 6, 1953     H. V. KINDSETH     2,624,309
PASTING MECHANISM FOR BAG CLOSING AND SEALING MACHINES
Filed Nov. 13, 1950     6 Sheets-Sheet 4
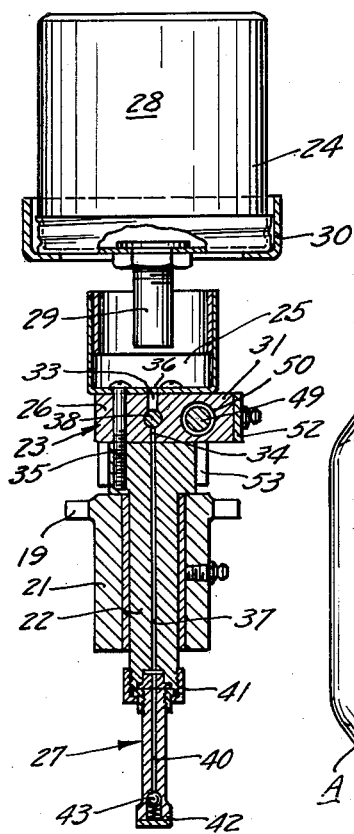
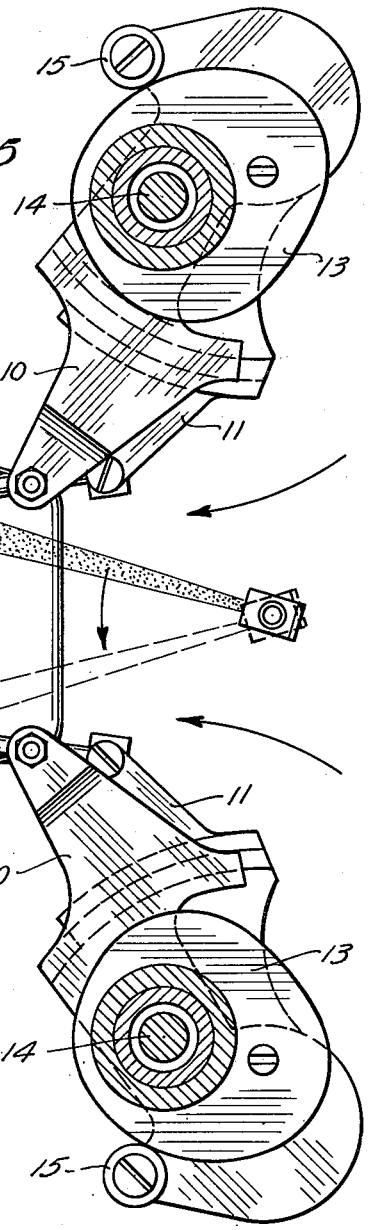
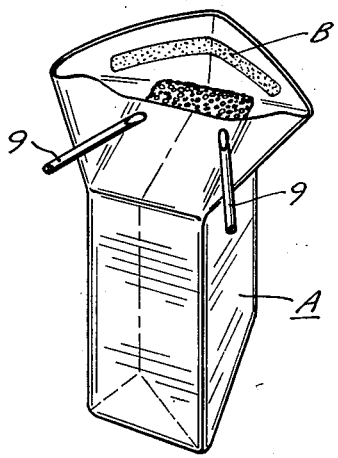
Inventor
Harold V. Kindseth
By Merchant & Merchant
Attorneys Jan. 6, 1953 H. V. KINDSETH 2,624,309
PASTING MECHANISM FOR BAG CLOSING AND SEALING MACHINES
Filed Nov. 13, 1950 6 Sheets-Sheet 5
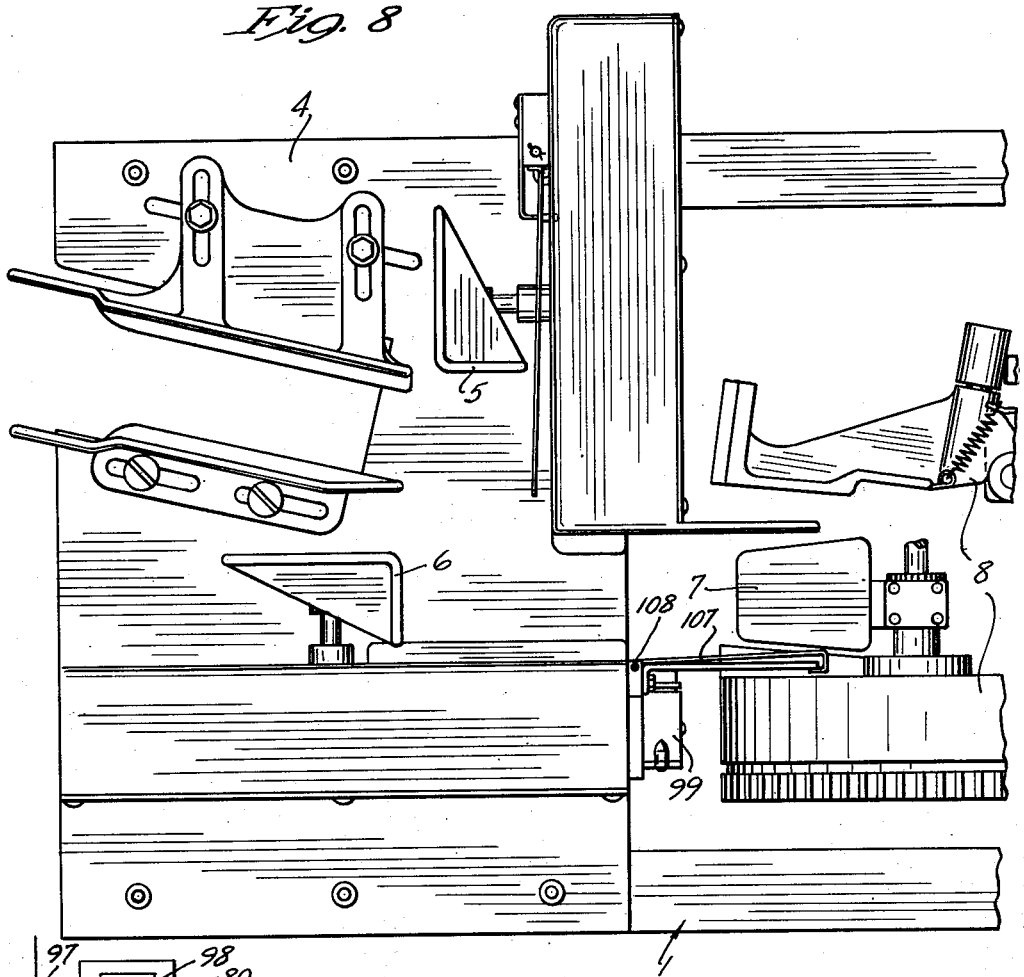
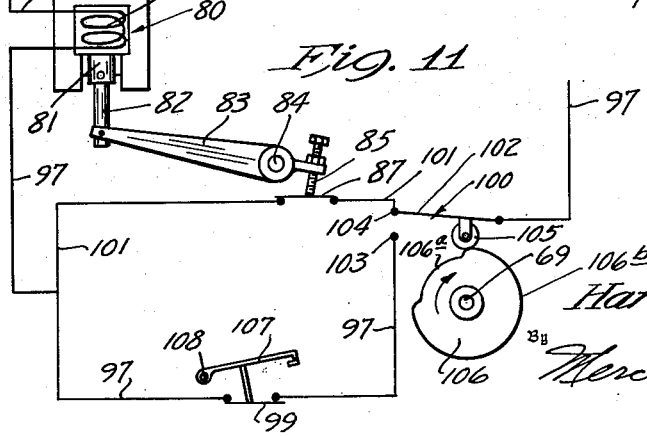
Inventor
Harold V. Kindseth
By
Merchant & Merchant
Attorneys Jan. 6, 1953  H. V. KINDSETH  2,624,309
PASTING MECHANISM FOR BAG CLOSING AND SEALING MACHINES
Filed Nov. 13, 1950  6 Sheets-Sheet 6

Inventor
Harold V. Kindseth
By Merchant & Merchant
Attorneys

Patented Jan. 6, 1953

2,624,309

UNITED STATES PATENT OFFICE 2,624,309

PASTING MECHANISM FOR BAG CLOSING AND SEALING MACHINES

Harold V. Kindseth, Minneapolis, Minn., assignor to Bemis Bro. Bag Co., Minneapolis, Minn., a corporation of Missouri Application November 13, 1950, Serial No. 195,447

12 Claims. (Cl. 118—8)

My present invention relates generally to improvements in bag closing and sealing machines and more specifically to mechanism for applying liquid adhesive such as paste or the like to certain areas of the top wall of a bag prior to folding the same into bag closing and sealing relation.

More particularly, the present invention relates to improvements in pasting mechanism for use in machines of the type disclosed in the United States patents to Daniel Belcher, No. 1,989,471 and Harold V. Kindseth, No. 2,279,328.

In the closing and sealing of bags made from relatively flimsy material such as thin paper, cellophane, and the like, it has been found that paste applicators which come into actual contact with the bag wall areas to be pasted frequently cause the otherwise unsupported bag wall portions to partially collapse, thereby preventing the proper folding and sealing thereof. An important object of my invention is, therefore, the provision of means whereby a stream of liquid adhesive such as paste or the like may be impinged upon a wall surface area of a bag to be sealed without otherwise disturbing the bag wall.

Another object of my invention is the provision of a paste applicator as set forth which will apply a stream of paste to the bag wall in a definite predetermined quantity.

Another object of my invention is the provision of a paste applicator, as set forth, comprising a pump and a nozzle, and mechanism whereby the nozzle may be oscillated to direct the stream of paste over an elongated wall surface area of the bag to be sealed.

Still another object of my invention is the provision of novel means whereby simultaneous oscillatory and pumping movements are imparted to said nozzle and pump mechanism, respectively.

Still another object of my invention is the provision of pumping mechanism which will deliver a definite predetermined quantity of paste through said nozzle under high pressure.

A still further object of my invention is the provision of novel means for controlling the operation of the paste applicator mechanism in definite timed relation to the feeding of a bag to the machine, whereby paste is ejected from the nozzle of the applicator only when a bag is positioned to receive the paste on one of its walls. By this means, paste is prevented from being sprayed or squirted on the folding apparatus when a bag is not in paste-receiving position.

Still another object of my invention is the provision of improved pasting apparatus which is relatively simple and inexpensive to produce, which is highly efficient in operation, and which is rugged in construction and durable in use.

Other highly important objects and advantages of my invention will become apparent from the following detailed specification, appended claims, and attached drawings.

Referring to the drawings, which illustrate the invention, and in which like characters indicate like parts throughout the several views:

Fig. 3 is a fragmentary section taken substantially on the line 3—3 of Fig. 2;

Fig. 5 is a still further enlarged view partly in plan and partly in section taken substantially on the line 5—5 of Fig. 3;

Fig. 6 is an axial section taken on the line 6—6 of Fig. 3 and on an enlarged scale;

Fig. 7 is a fragmentary view in perspective of a filled bag having paste applied to a wall surface area and illustrating the initial closing step thereof;

Fig. 8 is an enlarged fragmentary view in plan as seen from the line 8—8 of Fig. 1;

Fig. 11 is a wiring diagram of the control means of my invention.

Figure 1:
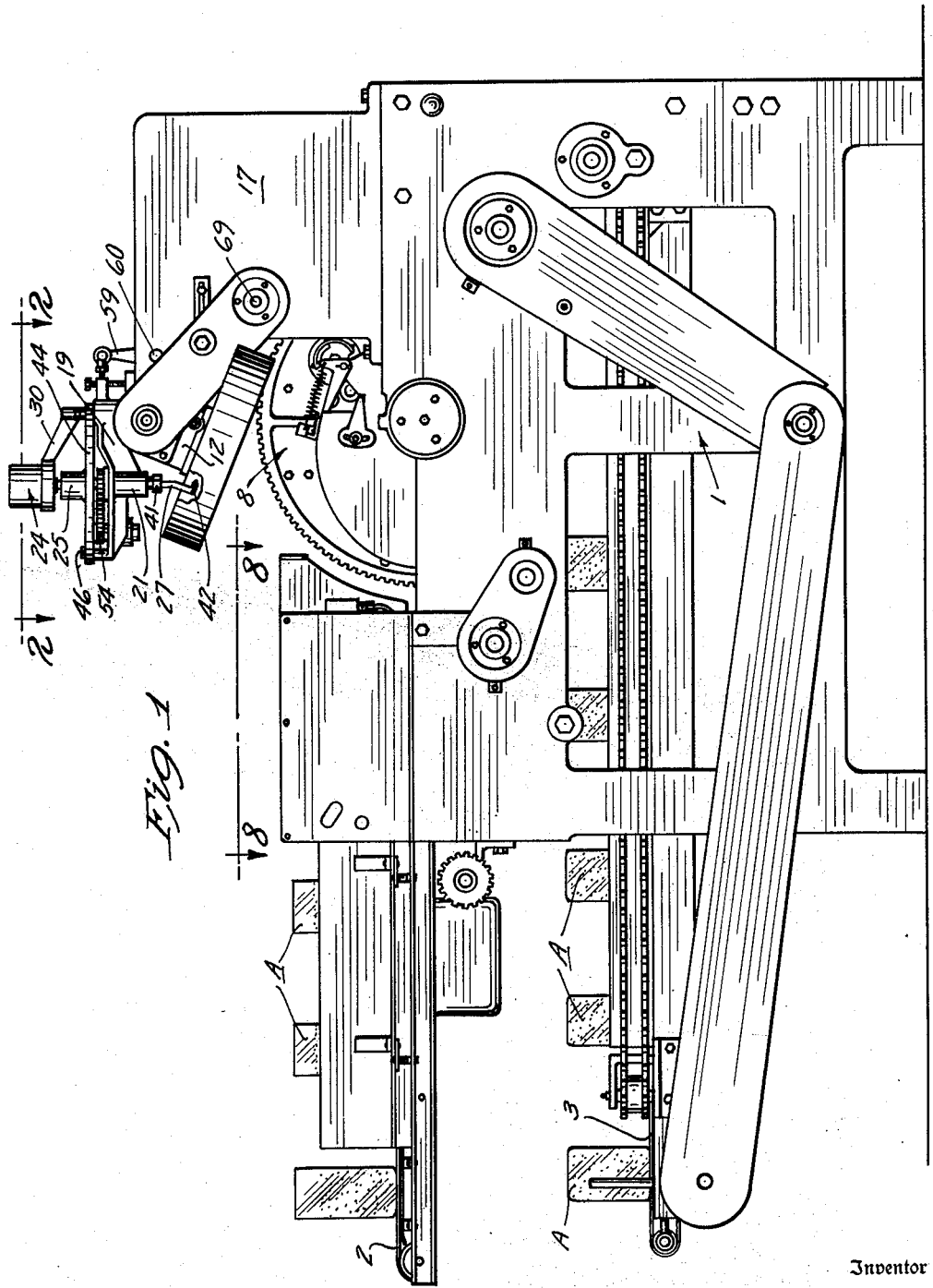
Fig. 1 is a view in side elevation of a bag closing and sealing machine incorporating my novel pasting mechanism.

Referring with greater detail to the drawings, the numeral 1 indicates in its entirety a frame which carries suitably mounted endless feed belts 2 and 3, the former of which delivers filled bags to the closing and sealing mechanism of the machine and the latter of which discharges the sealed bags therefrom. The conveyor or feed belt 2 disposes filled bags, indicated by A on a feed table 4 from which they are moved by transverse and longitudinal pushers 5 and 6 respectively to bag supporting members or pockets 7 in a rotatable transport and supporting device 8. The supporting device 8 and the conveyors 2 and 3 are driven by suitable means such as a motor, not shown, but mounted on the frame 1, through suitable transmission mechanism also not shown. The portions of the machine above referred to are clearly shown and described in detail in the patents to Belcher and Kindseth, above identified; hence, for the sake of brevity, it is thought unnecessary to described the same in detail herein.

The bag-top closing mechanism herein illustrated is similar to the corresponding structure disclosed in the above-mentioned patents, and is, therefore, described but briefly herein. Said mechanism comprises a pair of oppositely moving fingers 9 each supported in arms 10 and 11 mounted in suitable operating heads 12, see Figs. 2 and 3. The arms 10 and 11 associated with each head 12 are driven by cams 13 mounted on power driven shafts 14. The cams 13 work against cam follower rollers 15 which impart folding movements to the fingers 9 to close the bag A in the manner indicated in the Belcher patent, above identified.

The frame 1 is provided with a pair of laterally spaced unstanding parallel side frame members 16 and 17 which are connected at their upper front end portions by a cross bar or frame member 18 rigidly secured thereto by suitable means. A mounting bracket 19 is adjustably secured to the cross bar 18 by a clamping head 20 which permits lateral and vertical adjustment of the bracket 19 with respect to the cross bar 18. The bracket 19 overlies the path of travel of the filled bags A while being held in the supporting means 7 and is provided intermediate its ends with a depending tubular boss or sleeve 21 in which is mounted for limited rotary or oscillatory movements a spindle-like conduit portion 22 of a paste applicator indicated in its entirety by 23. With particular reference to Fig. 6, it will be seen that the paste applicator 23 further includes a reservoir 24, a receiving tank or bowl 25 which receives paste from the reservoir by gravity flow, a high pressure pump 26, and a nozzle-equipped discharge head 27. The reservoir 24 is in the nature of an inverted preferably transparent receptacle 28 having attached thereto a discharge conduit 29. The receptacle 28 is supported in a bracket 30 that is carried by the applicator mounting bracket 19.

The pump 26 comprises a housing 31 which defines a pump cylinder 32, an inlet passage 33 communicating with the cylinder 32, an outlet passage 34 communicating with the cylinder 32 in lateraly spaced relationship to the inlet passage 33 and extending downwardly from the cylinder 32. The receiving tank or bowl 25, the pump housing 31, and the conduit sleeve 22 are rigidly secured together by machine screws or the like 35. An aperture 36 in the bottom of the receiving bowl 25 is axially aligned with the inlet passage 33 of the pump housing 31 and the outlet passage 34 is aligned with an axial passage 37 in the conduit sleeve 22. The pump 26 further includes a piston plunger 38 which is mounted for axial pumping movements in the cylinder 32 and which projects laterally outwardly from the housing 31, the extreme outer end being rigidly secured to a head element 39 for a purpose which will hereinafter become apparent.

The paste discharge head 27 is provided with an axial paste passage 40 and is secured to the lower end of the end of the conduit sleeve 22 by suitable means such as a clamping nut 41, the passage 40 being in alignment and registering with the passage 37 in said conduit sleeve. At its lower end, the discharge head 27 terminates in a discharge nozzle 42 communicating with the passage 40. A spring-loaded ball check valve 43 is contained within the lower end portion of the discharge head 27, and prevents paste from accidently seeping downwardly through the passages 37 and 40.

Figure 4:
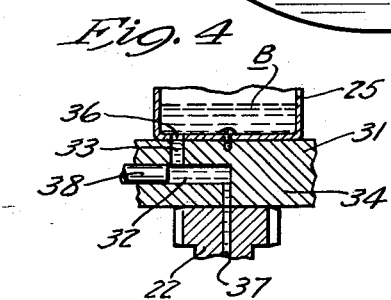
Fig. 4 is a fragmentary detail in section taken on the line 4—4 of Fig. 2.

Means for imparting reciprocatory pumping movements to the pump plunger 38 responsive to oscillatory movements of the paste applicator 23 comprises a stationary cam 44 and a cam follower roller 45 journalled for rotation in the pump plunger head 39. The cam 44 is rigidly secured at one end portion to the outer end of the bracket 19 by a bolt or the like 46; and at its inner end portion, the cam 44 is clamped between the inner end portion of the bracket 19 and the inner end of the reservoir mounting bracket 30. By reference to Fig. 3, it will be seen that the mounting bracket 30 and the inner end portion of the cam 44 are secured by means of machine bolts or the like 47 extending downwardly therethrough into the bracket 19. It should also be noted that the cam 44 defines an arcuate cam surface 48 which is eccentric to the axis of oscillatory movement of the applicator; that oscillatory movement of the applicator in one direction causes the cam follower 45 and the pump plunger 38 associated therewith to move inwardly with respect to the pump cylinder 32; and that oscillatory movement of the applicator in the opposite direction permits outward movement of the pump plunger 38 with respect to the cylinder 32. A guide rod 49 extends through an aperture 50 in the pump housing 31 and is rigidly secured at one end to the head 39 in spaced parallel relationship to the pump plunger 38. The guide rod 49 is yieldingly urged in a direction to cause engagement of the roller 45 with the cam surface 48 by a coil compression spring 51 interposed between the opposite end of the guide rod 49 and a stop member or bracket 52 rigidly secured to the pump housing 31. Obviously, the amount of paste to be ejected through the nozzle 42 is dependent upon the diameter of the cylinder 32 and the length of stroke of the piston 38, said length of stroke being determined by the amount of eccentricity of the cam surface 48 with respect to the axis of oscillatory movement of the applicator. Bearing in mind that outward spring-based movement of the pump plunger 38 causes paste, indicated by B in Figs. 4 and 7, to be drawn into the cylinder 32, and that inward pumping movement is positively imparted to the pump plunger 38 by the cam 44, it should be obvious that the stream of paste being ejected from the nozzle is subject to extremely high pressure. This arrangement assures that all of the paste which is ejected from the nozzle at each pumping stroke from the pump plunger 38 will be impinged upon the wall surface of a bag to be sealed and that any dripping of paste from the nozzle 42 between pumping operations will be virtually eliminated. The paste B is preferably of relatively high viscosity and is drawn into the cylinder 32 by a partial vacuum produced in the cylinder upon outward movement of the pump plunger 38. The spring 51 has sufficient strength to maintain the roller 45 in engagement with the cam surface 48 in all positions of the plunger 38 against the partial vacuum set up in the cylinder 32 during the return swinging or oscillatory movement of the applicator.

Oscillatory swinging movements are imparted to the nozzle 42 and parts associated therewith by novel means now to be described. The upper end conduit portion or sleeve 22 of the applicator is formed to provide gear teeth 53 which have meshing engagement with the teeth of a segmented rack or gear 54 that is pivoted on a stub shaft 55 extending upwardly from the outer end portion 56 of the bracket 19. The rack 54 has an outwardly projecting arm 57 to the outer end of which is pivotally connected one end of a rigid link 58, the other end of which is pivoted to the outer end of a crank 59 mounted fast on a rock shaft 60 that extends transversely of and is journalled for rocking movements in the side frame members 16 and 17. A coil tension spring 61 has one end secured to a pin 62 at the outer end of the crank 59 and its opposite end secured to a pin 62' anchored in a laterally outwardly projecting lug or ear 63 integrally formed with the outer end portion of the bracket 19 whereby to exert a yielding bias on the crank 59 in a direction to cause the applicator to move toward a pump plunger-retracted position, as shown by full lines in Fig. 2. A relatively short second crank 64 extends radially outwardly from the rock shaft 60 at substantially right angles to the crank 59 and has pivotal engagement at its outer end with the upper end of a rigid link 65, as indicated at 66. By reference to Fig. 3, it will be seen that the crank 64 is keyed to the rock shaft 60 as indicated at 67.

The rigid link 65 is provided intermediate its ends with a longitudinally extending slot or opening 68 through which extends a rotary power driven shaft 69. The shaft 69 is journalled in the side frame members 16 and 17 in spaced parallel relation to the rock shaft 60 and is driven from the motor by suitable means, not shown. At its lower end, the link 65 is provided with bearing lugs 70 mounting a short shaft 71 to which is connected a latch dog 72. By reference to Fig. 3, it will be seen that the latch dog 72 is capable of swinging movements toward and away from the lower end 73 of the link 65 and is yieldingly biased toward said lower end by a coil spring 74 connected at its opposite ends to the link 65 and the latch dog 72. A cam follower roller 75 is suitably mounted on the latch dog 72 and is engaged by a cam 76 mounted fast on the power driven shaft 69. During normal operation of the machine, the latch dog 72 is maintained in operative relationship to the link 65 by a lever-acting latch hook 77 pivotally mounted intermediate its ends to the link 65 as indicated at 78. The latch hook 77 is biased toward engagement with the latch dog 72 by a coil compression spring 79 interposed between the latch hook 77 and the adjacent side of the link 65. Movement of the latch hook 77 out of latching engagement with the latch dog 72 causes the latch dog 72 to move about the axis of its pivot 71, upon rotation of the cam 76, independently of the link 65, thus rendering the same inoperative to oscillate the paste applicator.

Figure 9:
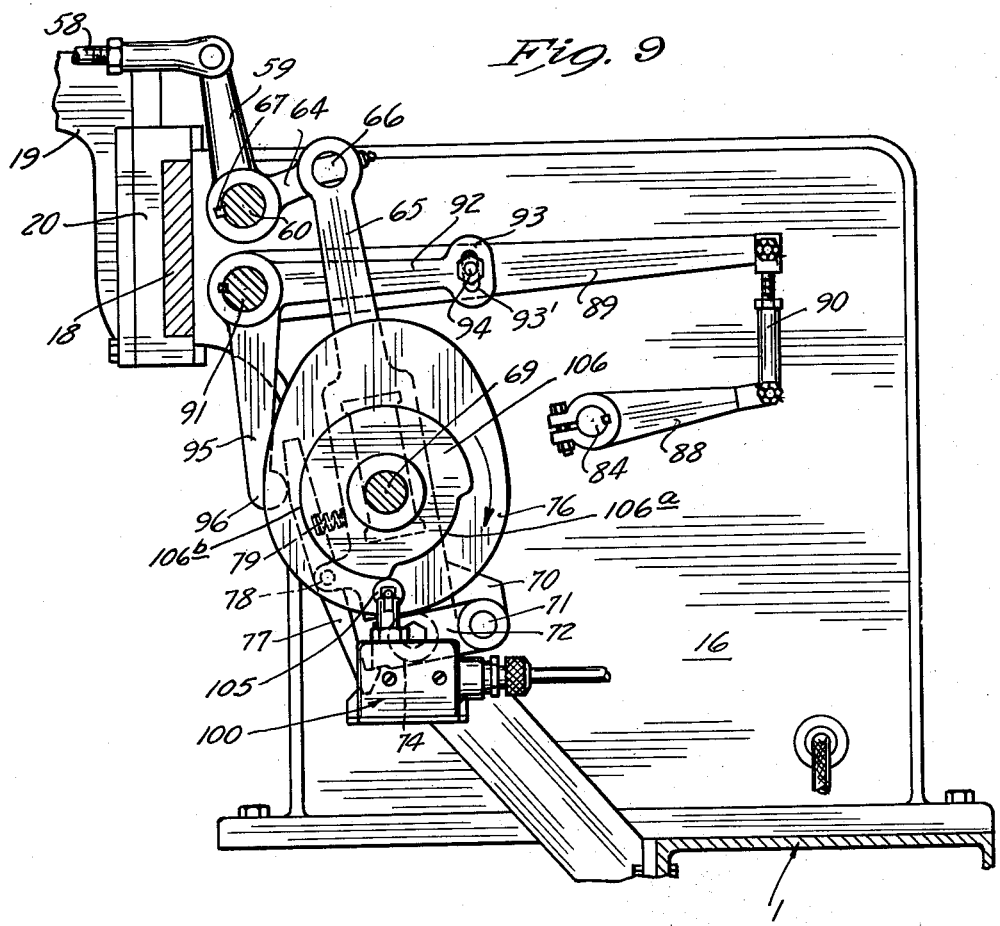
Fig. 9 is an enlarged fragmentary view partly in side elevation and partly in section taken substantially on the line 9—9 of Fig. 2.
Figure 10:
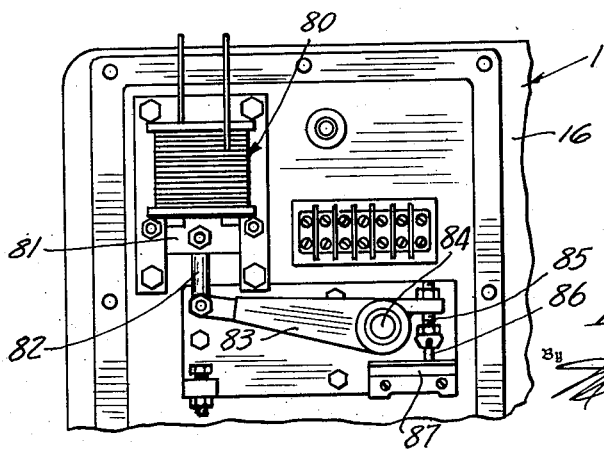
Fig. 10 is a fragmentary view in side elevation, with some parts removed, of a portion of the machine opposite the side of Fig. 1.

Mechanism for controlling the above described applicator operating means includes an electrical circuit having interposed therein suitable switches, a solenoid and linkage operated by said solenoid and associated with the latch hook 77. The solenoid, indicated by the numeral 80, is mounted on the side frame member 16 and is provided with an armature 81 which is connected by a rigid link 82 to the free end of a crank-acting lever arm 83. Said lever arm 83 is mounted fast adjacent its other end on a rock shaft 84 which is journalled in the side frame member 16 and at its extreme other end portion is provided with an adjustable abutment in the nature of a machine screw or the like 85 which engages the actuating button 86 of a holding switch 87. The rock shaft 84 projects laterally inwardly of the side frame member 16 and at its other end has mounted fast thereon a relatively short crank arm 88, the free end of which is connected to the free end of a relatively long crank arm 89 by a rigid adjustable link 90. The other end of said crank arm 89 is journalled on a rock shaft 91 which extends transversely of the machine and is journalled in the opposite side plates 16 and 17 in spaced parallel relationship with the rock shaft 60 and the power-driven shaft 69. The crank arm 89 is secured to the rock shaft 91 for common movements therewith by an auxiliary arm 92 which is keyed or otherwise rigidly secured to the rock shaft 91 and which at its free end is provided with a slotted head portion 93. A nut-equipped stud 94 extends laterally from the intermediate portion of the arm 89 through the slot 93' in the head 93 and permits limited relative movements between the arms 89 and 92. A crank-acting latch actuator 95 is also rigidly secured at one end to the rock shaft 91 and at its free end is provided with a head 96 which is adapted to engage the free end portion of the latch hook 77. With particular reference to Figs. 3, 9 and 10, it will be seen that energization of the solenoid 80 will cause upward movement of the armature 81 with consequent movement of the linkage, above described, including the latch actuator member 95, in a direction to release the latch dog 72 for cam-imparted movements independently of the linkage therebetween and the paste applicator. In other words, when the latch dog 72 is released from engagement with the latch hook 77, rotation of the cam 76 will impart movement only to the cam follower roller 75 and the latch dog 72, the link 65 remaining stationary. On the other hand, de-energization of the solenoid 80 will permit the spring 79 to move the latch hook 77 into locking engagement with the latch dog 72 so that when the cam follower roller 75 is moved by the cam 76, the link 65 and other linkage associated therewith will oscillate the paste applicator.

The electrical circuit for the solenoid 80 includes a lead 97 which may be assumed to extend from a source of electrical power such as the opposite sides of a power line, not shown. Interposed in the lead 97 is the winding 98 of the solenoid 80, a feeler switch 99, and a two-position cam-operated limit switch 100. A shunt circuit for the feeler switch 99 includes a lead 101 extending from the lead 97 between the solenoid winding 98 and the feeler switch 99 to the other side of the limit switch 100, the holding switch 87 being interposed therein. It will be noted that the lead 97 extends through the limit switch 100 when the switch arm 102 thereof is positioned to engage a contact 103 whereas the shunt lead 101 terminates in a contact 104 which is engaged by the switch arm 102 in the other position of the limit switch 100. The limit switch 100 is provided with a cam follower roller 105 which is positioned to be engaged by a limit switch cam 106 mounted fast on the power-driven rotary shaft 69.

The feeler switch 99 is of the normally closed type located adjacent the path of travel of filled bags into the bag-supporting element 8 and is provided with a bag-engaging feeler 107 which is pivotally mounted as indicated at 108, see Figs. 8 and 11, in a manner to be moved by filled bags entering the bag-supporting means 7. It will be noted that the feeler 107 is elongated in the direction of travel of the filled bags toward the bag-supporting means for a purpose which will become apparent. It should be further noted that the holding switch 87 is of the normally open type and is closed by energization of the solenoid 80.

With the bag closing and sealing machine running and no bags being fed therethrough, the solenoid 80 is energized by completion of a circuit through the lead 97 when the limit switch arm 102 engages the switch contact 103 responsive to rotary movement of the limit switch cam 106 sufficient to bring follower roller 105 into registration with the relatively low cam surface 106a thereon. Energization of the solenoid 80 causes the holding switch 87 to be closed, thereby closing a holding circuit through the solenoid winding 98, a portion of the lead 97, the shunt lead 101, and the contact 104 and the switch arm 102 when the cam follower roller 105 engages the relatively high cam surface 106b. When the holding switch 87 is closed by the movement of the lever arm 83, there is sufficient overtravel in the switch 87 in a switch-closed direction so that during the relatively short time interval required for the travel of the limit switch arm 102 from its engagement with the contact 103 until it engages the contact 104, the solenoid armature 81 will not be permitted to drop sufficiently to open the holding switch 87. This arrangement permits substantially constant energization of the solenoid 80 whereby to maintain the paste applicator inoperative.

When a filled bag is moved by the longitudinal bag pusher 6 toward the bag-supporting element 7, the bag A will engage the feeler 107 and move the same laterally to open the feeler switch portion 99, the length of the feeler 107 permitting switch-opening contact thereof by the bag for a sufficient length of time to permit rotation of the limit switch cam 106 to a point where the cam follower 105 moves to the low portion 106a of the cam. The circuit through the solenoid winding 98 is then broken through the shunt lead 101 at the limit switch 100 and through the lead 97 at the feeler switch 99 thereby de-energizing the solenoid 80. It should here be noted that when the solenoid 80 is energized, the stud 94 engages the upper end of the slot 93' in the head 93 whereby the crank arm 89 is moved to its upper position to cause the latch hook 77 to be moved out of the path of travel of the latch dog 72. When the solenoid 80 is de-energized, however, the stud 94 will be moved downwardly in the slot 93' of the head 93 permitting the spring 79 to move the latch hook 77 into latching engagement with the latch dog 72. Continued rotation of the shaft 69 and limit switch cam 106 causes the cam follower 105 to rise into engagement with the cam surface 106b during which time the filled bag A has been carried out of engagement with the feeler 107. At this stage of the cycle of operation, the solenoid 80 will not be re-energized by reason of the fact that the holding switch 87 has been opened and will stay open until rotation of the cam 106 causes the limit switch arm 102 to engage the limit switch contact 103. Of course, as soon as this engagement is made, the solenoid 80 will be again energized to prevent another oscillation and paste ejecting cycle of the applicator. Obviously, if the filled bags are fed to the supporting means in an uninterrupted series, the feeler switch will be maintained in an open condition and the solenoid remains de-energized until the series of bags is interrupted.

Figure 2:
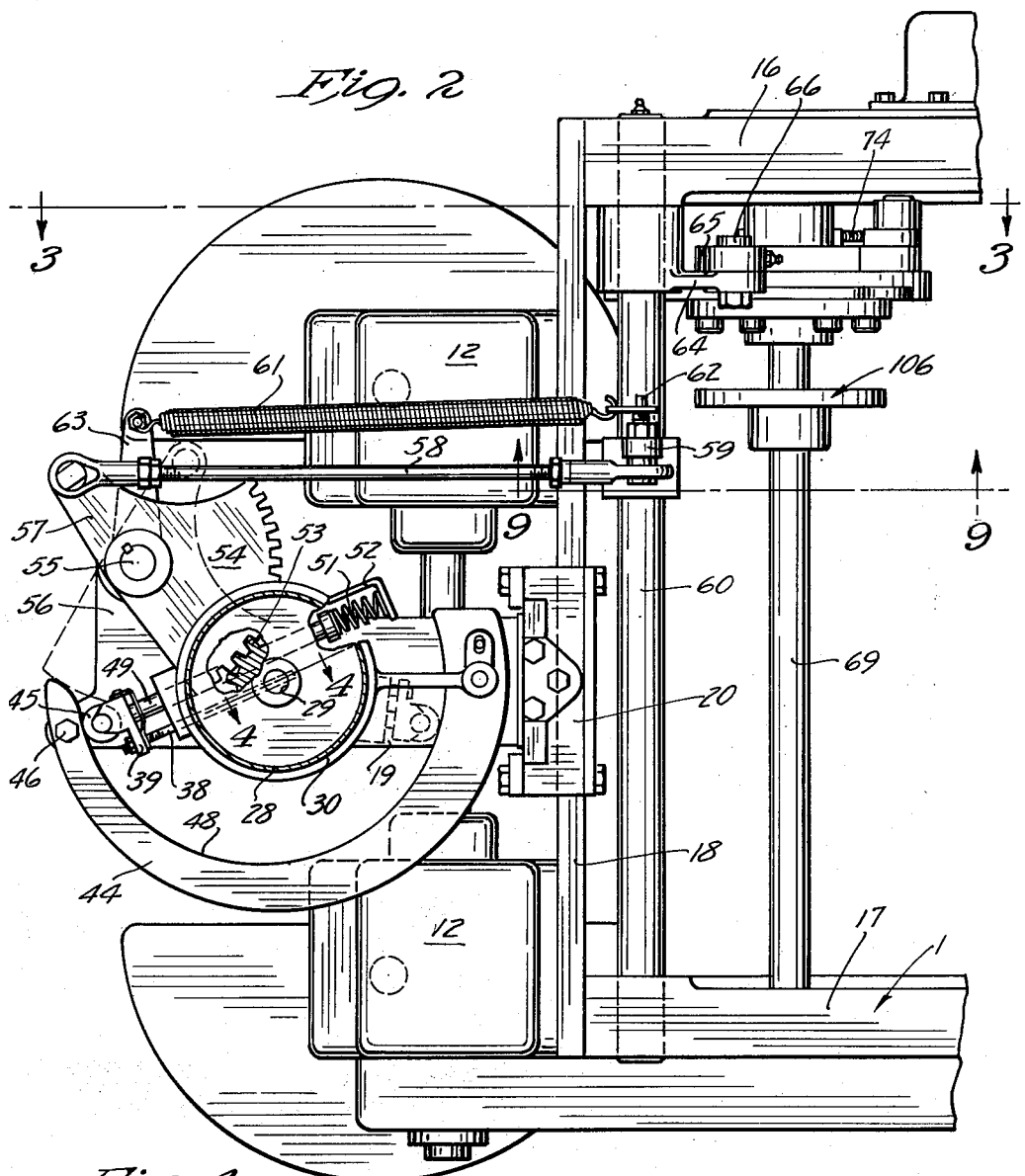
Fig. 2 is a fragmentary view partly in plan and partly in horizontal section taken substantially on the line 2—2 of Fig. 1 and on an enlarged scale.

With reference to Figs. 2 and 3, it will be seen that the movement of the linkage for oscillating the applicator will cause the same to oscillate the applicator about an arc of less than 180°. During the initial oscillatory stroke of the applicator, said stroke being during the initial pumping of stroke or oscillation, the movement being counterclockwise with respect to Fig. 2, the paste B is spread over a narrow elongated area on an inner wall surface of the bag A, as indicated in Figs. 5 and 7. The machine is timed so that the fingers 9 turn down a portion of the upper wall of the bag A just prior to application of the paste to the inner surface of the opposite wall portion. Lateral outward movements of the fingers 9 cause the pasted portion of the bag wall to be moved downwardly into sealing engagement with the initially turned down wall portion of the bag, as fully disclosed in the prior patents above identified. During the return oscillation of the applicator, from the dotted-line position to the full-line position of Fig. 2, said return being accomplished by the tension of the spring 61, the pump plunger 38 is retracted outwardly and draws paste into the cylinder 32 from the receiving tank 25, preparatory to a subsequent paste-applying cycle.

From the above, it should be obvious that I have provided a relatively simple and efficient means of applying paste for sealing of filled bags of various types and materials; and that by means of my novel operating control mechanism, paste is prevented from being accidentally discharged into the bag closing mechanism and other devices in the machine.

My invention has been thoroughly tested and found to be completely adequate for the accomplishment of the objectives set forth; and, while I have shown and described a commercial embodiment of my novel paster mechanism, it will be understood that the same is capable of considerable modification and that modification may be made without departure from the spirit and scope of the invention as defined in the claims.

What I claim is:

1. In a bag closing and sealing machine, means for supporting a filled bag, a paste applicator, said applicator comprising a reservoir, a pump, a pump plunger slidable in said pump, and a nozzle receiving paste under pressure from said pump and adapted to deliver the paste in a thin stream to the wall of said bag, means mounting said pump and nozzle for oscillatory movements whereby the paste is directed over a narrow elongated area of the bag wall, power driven mechanism for imparting oscillatory movements to said pump and nozzle, a stationary cam on said mounting means, and a cooperating cam follower associated with said pump plunger for common movements therewith, oscillatory movements of said pump and nozzle causing pumping movements to be imparted to said plunger by said cam.

2. The structure defined in claim 1 in further combination with yielding means biasing said pump plunger and cam follower toward engagement thereof with said cam.

3. In a bag closing and sealing machine, means for supporting a filled bag, mechanism delivering bags successively to said bag-supporting means, a paste applicator including a pump and nozzle for ejecting a stream of paste under pressure toward a wall of the bag to be sealed, means mounting said applicator for oscillatory movements of the pump and nozzle, power operated mechanism for imparting oscillatory movements to said nozzle and pumping movements to said pump to direct said stream of paste over an elongated area of the bag wall, said power operated means comprising a rotary shaft and driving connections operatively coupled thereto and to said applicator, and control means for said power operated mechanism, said control means comprising, means for uncoupling said linkage from said shaft and including an electrical circuit having interposed therein a solenoid winding and a pair of switches serially connected, one of said switches being normally closed and positioned to be opened by passage of a filled bag into said supporting means to initiate a cycle of operation of said applicator, cam means on said rotary shaft for operating the other of said switches, said other switch in one position being in series with said first-mentioned switch and said solenoid, and a shunt circuit having a holding switch interposed therein and including said solenoid and the cam operated switch in the other position thereof, said holding switch maintaining the circuit through said solenoid during movement of said cam-operated switch from one of its positions to the other thereof, operation of the cam-operated switch by the cam causing operating of said applicator in definite timed relationship to movement of a bag through the machine and terminating the cycle of operation.

4. In a bag closing and sealing machine, means for supporting a filled bag, a paste applicator, said applicator comprising a reservoir, a plunger-equipped pump and a nozzle receiving paste under pressure from said pump and adapted to deliver the paste in a thin stream to a wall of said bag, means mounting said applicator for oscillatory movements of said nozzle whereby the paste is directed over a narrow elongated area of the bag wall, power driven mechanism for imparting oscillatory movements to said pump and nozzle, said mechanism comprising a rotary shaft, a cam fast on said shaft, a cam follower engaging said cam and oscillated thereby, driving connections between said cam follower and said applicator means transmitting oscillatory movements of said cam follower to said applicator means, and mechanism for imparting pumping movements to said pump plunger responsive to oscillatory movements of the pump and nozzle, said last-mentioned mechanism including a cam and a cooperating cam follower, one on said mounting means and one on said pump plunger.

5. The structure defined in claim 4 in further combination with yielding means biasing said applicator and linkage in one direction of oscillatory movement thereof.

6. In a bag closing and sealing machine, means for supporting a filled bag, a paste applicator, said applicator comprising a reservoir, a plunger-equipped pump and a nozzle receiving paste under pressure from said pump and adapted to deliver the paste in a thin stream to a wall of said bag, means mounting said applicator for oscillatory movements of said nozzle whereby the paste is directed over a narrow elongated area of the bag wall, power driven mechanism for imparting oscillatory movements to said pump and nozzle, said mechanism comprising a rotary shaft, a cam fast on said shaft, a cam follower engaging said cam and oscillated thereby, driving connections between said cam follower and said applicator means transmitting oscillatory movements of said cam follower to said applicator means, mechanism for imparting pumping movements to said pump plunger responsive to oscillatory movements of the pump and nozzle, said last-mentioned mechanism including a stationary cam on said mounting means and a cooperating cam follower mounted on said pump plunger for common oscillatory movements with said applicator, and yielding means urging said last-mentioned cam follower toward engagement with said stationary cam.

7. A bag closing and sealing machine, movable means for supporting a sealed bag, paste applicator means including a nozzle for directing a stream of paste toward a wall of the bag to be sealed, means mounting said paste applicator means for swinging movements of said nozzle to direct the paste over an elongated area of the bag wall, pumping mechanism for forcibly ejecting the paste through said nozzle, power-operated mechanism for imparting oscillatory movements to said nozzle, said power-opearted mechanism comprising a rotary shaft, a cam on said shaft, an oscillating arm, a cam follower, means mounting said cam follower on said arm for cam-imparted movements independently of said arm, cooperating latch elements on said arm and cam follower mounting means for releasably locking said cam follower mounting means to said arm for common cam imparted movements therewith, driving connections between said arm and said applicator means for transmitting oscillatory movements of said arm to said applicator means, and control mechanism responsive to movement of said bag into the supporting means therefor to permit movement of said latch elements into locking engagement.

8. The structure defined in claim 7 in which said control mechanism comprises an electrical control circuit including a switch operatively engageable with said bag when the bag is moved into the holder, a solenoid, a timing switch, and cam means on said rotary shaft associated with the timing switch to initiate and terminate a period of operation of said applicator means in definite timed relation to movements of said bag-holding means, said solenoid being energized by closing of said switches to unlock said latch elements.

9. In a device of the class described, a paste applicator, means mounting said applicator in closely spaced relation to the path of travel of a filled bag to be closed and sealed, said paste applicator comprising a paste reservoir, a nozzle, and a pump receiving paste from said reservoir and delivering the same to said nozzle under sufficient pressure to cause said paste to be impinged upon a wall of the bag to be sealed, mechanism for imparting oscillatory movements to said nozzle whereby said paste is directed over an elongated area on said bag wall, and means actuated by swinging movements of said nozzle for operating said pump.

10. In a bag closing and sealing machine, means for supporting a filled bag, a paste applicator, said applicator comprising a reservoir, a plunger-equipped pump, and a nozzle receiving paste under pressure from said pump and adapted to deliver the paste in a thin stream to a wall of said bag, means mounting said applicator for oscillatory movements of said nozzle whereby the paste is directed over a narrow elongated area of the bag wall, power driven mechanism for imparting oscillatory movements to said pump and nozzle and mechanism on said mounting means and said pump for imparting pumping movement to said pump plunger responsive to said oscillatory movements of the pump and nozzle, said last-mentioned mechanism including a cam and a cooperating cam follower one on said mounting means and one associated with said pump plunger.

11. In a bag closing and sealing machine, means for supporting a filled bag, paste applicator means including a nozzle for directing a stream of paste toward a wall of the bag to be sealed, means mounting said paste applicator means for oscillatory movements of said nozzle to direct the paste over an elongated area of the bag wall, pumping mechanism for forcibly ejecting the paste through said nozzle, power operated mechanism for imparting oscillatory movements to said nozzle, said power operated mechanism comprising a rotary shaft, a cam on said shaft, a cam follower engaging said cam and oscillated thereby upon rotating of said cam and driving connections between said cam follower and said applicator means for transmitting oscillatory movements of said cam follower to said applicator means, said driving connections including an oscillatory arm means mounting said cam follower on said arm, and latch mechanism operative in one position to lock said cam follower mounting means to said arm for common cam-imparted movements therewith and in another position to permit movements to be imparted to said cam follower by said cam independently of said arm.

12. In a bag closing and sealing machine, means for supporting a sealed bag, paste applicator means including a nozzle for directing a stream of paste toward a wall of the bag to be sealed, means mounting said paste applicator means for oscillatory movements of said nozzle to direct the paste over an elongated area of the bag wall, pumping mechanism for forcibly ejecting paste through said nozzle, power operated mechanism for imparting swinging movements to said nozzle, said power operated mechanism comprising a rotary shaft, a cam on said shaft, a cam follower engaging said cam and oscillated thereby upon rotation of said cam, and driving connections between said cam follower and said applicator means for transmitting oscillatory movements of said cam follower to said applicator means, said driving connections including an oscillatory arm means mounting said cam follower on said arm, and latch mechanism operative in one position to lock said cam follower mounting means to said arm for common cam-imparted movements therewith and in another position to permit movements to be imparted to said follower by said cam independently of said arm, and yielding means biasing said latch mechanism in a direction to lock said cam follower mounting means in operative engagement with said arm.

HAROLD V. KINDSETH.

REFERENCES CITED

The following references are of record in the file of this patent:

UNITED STATES PATENTS

| Number | Name | Date |
|---|---|---|
| 2,369,513 | Zahodiakin | Feb. 13, 1945 |
| 2,519,102 | Bergstein | Aug. 15, 1950 |